United States Patent
Yokoyama

(10) Patent No.: US 8,917,712 B2
(45) Date of Patent: Dec. 23, 2014

(54) COMMUNICATION TERMINAL DEVICE, BASE STATION, AND COMMUNICATION METHOD

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1011 days.

(21) Appl. No.: 11/654,662

(22) Filed: Jan. 18, 2007

(65) Prior Publication Data

US 2008/0037502 A1 Feb. 14, 2008

(30) Foreign Application Priority Data

Aug. 11, 2006 (JP) ................. 2006-219630

(51) Int. Cl.
*H04J 3/06* (2006.01)
*H04W 56/00* (2009.01)
*H04B 7/26* (2006.01)
*H04W 92/10* (2009.01)

(52) U.S. Cl.
CPC ......... *H04W 56/0045* (2013.01); *H04B 7/2656* (2013.01); *H04J 3/0685* (2013.01); *H04W 92/10* (2013.01); *Y02B 60/50* (2013.01)
USPC ............................. 370/350; 370/310; 455/502

(58) Field of Classification Search
USPC .................... 370/350, 310; 455/502
See application file for complete search history.

(56) References Cited

U.S. PATENT DOCUMENTS

| | | | |
|---|---|---|---|
| 5,361,398 A * | 11/1994 | Christian et al. | 455/503 |
| 6,470,057 B1 * | 10/2002 | Hui et al. | 375/294 |
| 6,519,469 B1 | 2/2003 | Rydnell et al. | |
| 6,532,225 B1 * | 3/2003 | Chang et al. | 370/341 |
| 6,665,307 B1 | 12/2003 | Rydnell et al. | |
| 6,947,035 B1 * | 9/2005 | Shiraga | 345/211 |
| 7,403,789 B2 * | 7/2008 | Takano et al. | 455/502 |
| 7,957,351 B2 * | 6/2011 | Casaccia et al. | 370/334 |
| 8,108,749 B2 * | 1/2012 | Cookman et al. | 714/752 |
| 2002/0009129 A1 * | 1/2002 | Choi et al. | 375/149 |
| 2004/0057407 A1 * | 3/2004 | Balachandran et al. | 370/336 |
| 2004/0081127 A1 * | 4/2004 | Gardner et al. | 370/338 |
| 2004/0196826 A1 * | 10/2004 | Bao et al. | 370/352 |
| 2005/0232155 A1 * | 10/2005 | Morikawa et al. | 370/235 |
| 2005/0249227 A1 * | 11/2005 | Wang et al. | 370/412 |

(Continued)

FOREIGN PATENT DOCUMENTS

| | | |
|---|---|---|
| GB | 2 418 806 A | 4/2006 |
| JP | 2003-503981 | 1/2003 |

(Continued)

OTHER PUBLICATIONS

M R L Hodges, "The GSM radio interface", Jan. 1990, Telecom Tehono J vol. 8 No. 1.*

(Continued)

*Primary Examiner* — Mehmood B Khan
(74) *Attorney, Agent, or Firm* — Fujitsu Patent Center

(57) ABSTRACT

In a communication terminal that performs bidirectional communication using different frequencies for transmission and reception, a receiving unit receives reception signals transmitted from the base station, a detecting unit detects the timing of DL when the receiving unit receives the reception signals, an adjusting unit adjusts the timing of UL to transmit the transmission signals so as to synchronize the timing of the DL 101 and the timing of the UL, and a transmitting unit transmits transmission signals to the base station based on the timing of UL adjusted.

11 Claims, 15 Drawing Sheets

(56) References Cited

U.S. PATENT DOCUMENTS

| | | | |
|---|---|---|---|
| 2006/0013189 A1* | 1/2006 | Fujimoto | 370/347 |
| 2006/0094473 A1* | 5/2006 | Stark et al. | 455/569.2 |
| 2006/0182029 A1* | 8/2006 | Kealy et al. | 370/230 |
| 2006/0223470 A1* | 10/2006 | Uchikawa et al. | 455/234.1 |
| 2007/0280208 A1* | 12/2007 | Smith et al. | 370/356 |
| 2008/0019306 A1* | 1/2008 | Damnjanovic | 370/329 |
| 2008/0031425 A1* | 2/2008 | Glynn et al. | 379/32.04 |

FOREIGN PATENT DOCUMENTS

| | | | | |
|---|---|---|---|---|
| JP | 2003-503982 | | 1/2003 | |
| WO | WO 00/33511 | * | 6/2000 | ............ H04L 12/26 |
| WO | WO-2004/093476 | | 10/2004 | |
| WO | WO 2004093476 A1 | * | 10/2004 | ............ H04Q 7/22 |

OTHER PUBLICATIONS

Hodges, M.R.L.; "The GSM Radio Interface"; British Telecom Technology Journal, London, GB,; vol. 8 No. 1, Jan. 1990; pp. 31-43 XP000575496.

Eklund, C. et al.; "IEEE Standard 802.16: A Technical Overview of the Wirelessman Air Interface for Broadband Wireless Access"; IEEE Communications Magazine, IEEE Service Center, New York, NY; vol. 40, No. 6, Jun. 2002, pp. 98-107, XP001123517.

Xavier Pérez-Costa, Daniel Camps-Mur; *AU-APSD: Adaptive IEEE 802.11e Unscheduled Automatic Power Save Delivery*; 2006; XP-002446545; pp. 2020-2027.

Jeff Goldman; *Atheros Moves Forward With Wireless VoIP*; Jun. 16, 2005; XP-002446544; 3pages.

M R L Hodges; *The GSM Radio Interface*; British Telecom Technology Journal, London, GB, vol. 8, No. 1; Jan. 1990; pp. 31-43 (listing only-previously submitted Jul. 10, 2007).

C. Eklund et al; *IEEE Standard 802.16: A Technical Overview of the Wirelessman Air Interface for Broadband Wireless Access*; IEEE Communications Magazine, vol. 40, No. 6; Jun. 2002; XP001123517; pp. 98-107. (listing only-previously submitted Jul. 10, 2007).

Extended European Search Report; Application No. 07101052.4-2411; Aug. 30, 2007; Reference P107745EP00/DNL; 14pages.

"Japanese Office Action", mailed by JPO and corresponding to Japanese application No. 2006-219630 on Apr. 26, 2011, with partial English translation.

* cited by examiner

COMMUNICATION TERMINAL DEVICE, BASE STATION, AND COMMUNICATION METHOD

CROSS-REFERENCE TO RELATED APPLICATIONS

This application is based upon and claims the benefit of priority from the prior Japanese Patent Application No. 2006-219630, filed on Aug. 11, 2006, the entire contents of which are incorporated herein by reference.

BACKGROUND OF THE INVENTION

1. Field of the Invention

This invention relates to a communication terminal device, a base station, and a communication method with which bidirectional communication is performed by applying different frequencies for transmission and reception.

2. Description of the Related Art

Conventionally, voice over internet protocol (VoIP) that utilizes an internet protocol (IP) to realize an inexpensive voice call system via a router has been used. It is under study to realize VoIP also in a mobile communication system. Applying frequency division duplexing (FDD), which enables bidirectional communication by applying different frequencies for transmission and reception, for this VoIP is also under study.

In VoIP, a mobile communication system is proposed that receives down link (DL) data and transmits up link (UL) data periodically and shifts to a sleep mode when neither reception of the DL data (reception signal) nor transmission of the UL data (transmission signal) is performed.

FIG. 20 is a diagram of an outline of a scheduler scheme in a conventional mobile communication system. The horizontal axis, time, shown in FIG. 20 is a time axis. DL 101 is a time period when the communication terminal receives the DL data and UL 102 is a time period when the communication terminal transmits the UL data.

A blank period 103 is a time period when the communication terminal is in a sleep mode (an energy-saving standby mode) (hereinafter, "sleep mode period 103"). As shown in FIG. 20, in the conventional communication system, a communication interval T of the DL data reception and of the UL data transmission is notified to the communication terminal, and during the sleep mode period 103 which is the period other than the DL 101 and the UL 102, the communication terminal shifts to the sleep mode (for example, Publication PCT Application No. 2003-503982).

However, in the conventional technology described above, timing of the DL 101 may coincide with that of the UL 102 (the DL 101 and the UL 102 overlap each other) or may not, dependent on the timings of the DL 101 and the UL 102. When the timing of the DL 101 coincides with that of the UL 102, the DL 101 and the UL 102 shown in FIG. 20 overlap each other, and the sleep mode period 103 becomes longer.

On the other hand, in the example shown in FIG. 20, there is a time difference Δt between the DL 101 and the UL 102. In this case, because the communication terminal is operating during the DL 101 and the UL 102 and thus the sleep mode period 103 becomes short, there is a problem that power consumption becomes larger than when the timings of the DL 101 and the UL 102 coincide.

Moreover, training periods for the DL data reception and for the UL data transmission, respectively, are necessary just before the DL 101 and the UL 102, and the communication terminal is also operating during the training periods. When the timings of the DL 101 and of the UL 102 coincide with each other, the training periods for the DL 101 and for the UL 102, respectively, also coincide with each other. On the other hand, when the timings of the DL 101 and of the UL 102 do not coincide with each other, the training period becomes longer than when the timings of the DL 101 and of the UL 102 coincide with each other, and the operating time of the communication terminal becomes longer. This causes a problem to increase power consumption.

SUMMARY OF THE INVENTION

It is an object of the present invention to at least solve the above problems in the conventional technologies.

A communication terminal according to one aspect of the present invention performs bidirectional communication using different frequencies for transmission and reception. The communication terminal includes a receiving unit that receives a reception signal transmitted from a base station; a detecting unit that detects reception timing at which the reception signal is received by the receiving unit; an adjusting unit that adjusts transmission timing at which a transmission signal is to be transmitted so as to synchronize with the reception timing; and a transmitting unit that transmits the transmission signal to the base station at the adjusted transmission timing.

A base station according to another aspect of the present invention includes a receiving unit that receives transmission signals transmitted from a plurality of communication terminals; a detecting unit that detects reception timing of each of the transmission signals; a computing unit that computes difference between each of the reception timing and a desirable reception timing; and a transmitting unit that transmits information on the difference to each of the communication terminals corresponding to each of the transmission signals.

A communication method according to still another aspect of the present invention is of a communication terminal that performs bidirectional communication using different frequencies for transmission and reception. The communication method includes receiving a reception signal transmitted from a base station; detecting reception timing at which the reception signal is received at the receiving; adjusting transmission timing at which a transmission signal is to be transmitted so as to synchronize with the reception timing; and transmitting the transmission signal to the base station at the adjusted transmission timing.

A communication method according to still another aspect of the present invention includes receiving transmission signals transmitted from a plurality of communication terminals; detecting reception timing of each of the transmission signals; computing difference between each of the reception timing and a desirable reception timing; and transmitting information on the difference to each of the communication terminals corresponding to each of the transmission signals.

A communication method according to still another aspect of the present invention is of a communication terminal that performs bidirectional communication using different frequencies for transmission and reception. The communication method includes a requesting means for making a request for an energy saving mode from the communication terminal; a checking means for checking whether the energy saving mode is possible for a communication destination terminal; and a setting means for setting up of a voice over internet protocol communication in the energy saving mode based on a result obtained at the checking.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
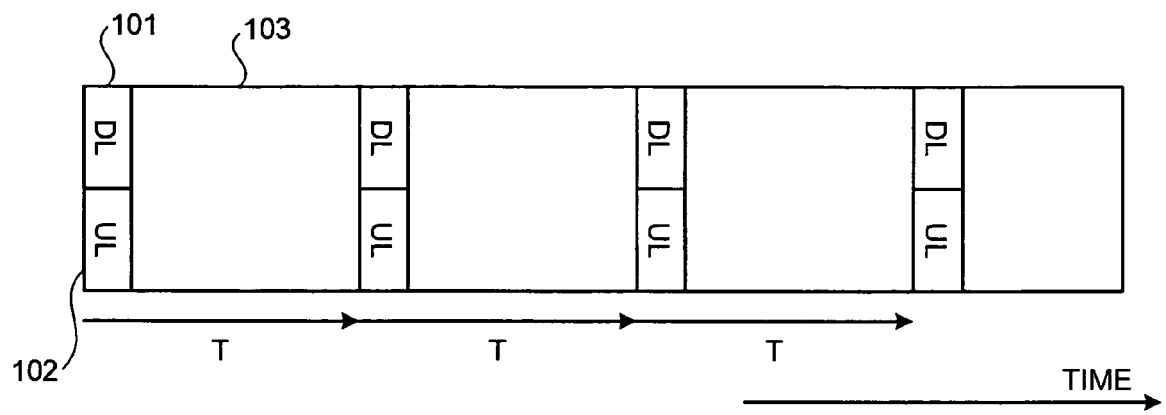
FIG. 1 is a schematic diagram for illustrating a scheduler scheme of a communication terminal according to an embodiment of the present invention.

FIG. 1 is a schematic diagram for illustrating a scheduler scheme of a communication terminal according to an embodiment of the present invention. As shown in FIG. 1, the communication terminal according to the present invention synchronizes the timing of the DL data reception with the timing of the UL data transmission, continuously. That is, the communication terminal according to the present invention sets $\Delta t$, shown in FIG. 20, to 0. As a result, the sleep mode period 103 of the communication terminal becomes longer than that in the scheduler scheme shown in FIG. 20, and the time period when the communication terminal is operating to receive the DL data or to transmit the UL data becomes shorter. By the way, the scheduler scheme mentioned here is a scheme to control the timing of the UL 102 shown in FIG. 1 or FIG. 20.

Figure 2:
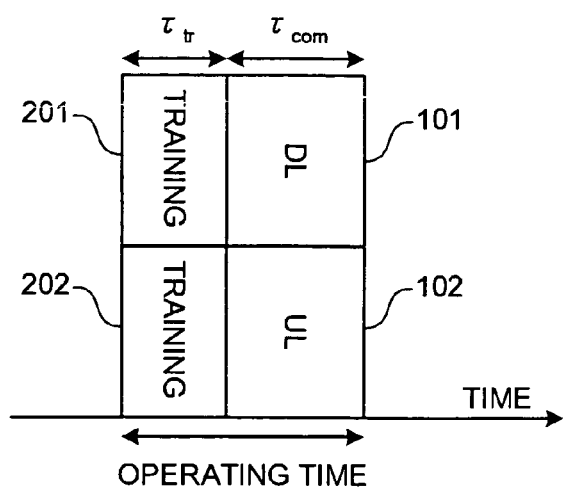
FIG. 2 is a detailed diagram of a DL and a UL shown in FIG. 1.

FIG. 2 is a detailed diagram of a DL and a UL shown in FIG. 1. As shown in FIG. 2, there are training periods 201 and 202 just before the communication terminal receives the DL data and just before it transmits the UL data, respectively. The training period 201 just before DL 101 is a period to detect the timing to decode the DL data.

The training period 2f2 just before the UL 102 is a period to detect the timing to transmit the UL data and to detect the frequency assigned to the communication terminal to transmit the UL data. The timing to transmit the UL data is detected based on the detection of the timing to decode the DL data.

Here, the lengths of the training periods 201 and 202 are set to $\tau_{tr}$, and the lengths of the periods when the communication terminal actually receives the DL data or actually transmits the UL data to $\tau_{com}$. Since the timings of the DL 101 and the UL 102 coincide with each other in the scheduler scheme according to the present invention shown in FIG. 1, the training periods 201 and 202 for the DL 101 and the UL 102, respectively, also coincide with each other. When the DL 101 and the UL 102, and the training period 201 and the training period 202, respectively, overlap thoroughly with each other as shown in FIG. 2, the length of the operation time period when the communication terminal receives the DL data once and transmits the UL data once, respectively, is $\tau_{tr}+\tau_{com}$.

Figure 20:
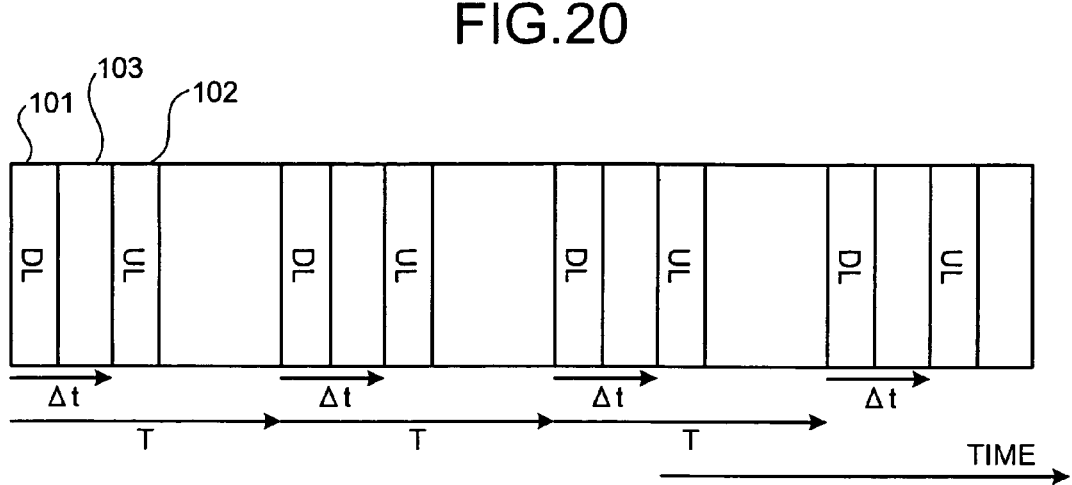
FIG. 20 is a schematic diagram of a scheduler scheme in a conventional mobile communication system.

In the scheduler scheme shown in FIG. 20, since the timings of the DL 101 and of the UL 102 do not coincide with each other, the training periods 201 and 202 for the DL 101 and for the UL 102, respectively, are required separately. That is, the length of the operating time period of the communication terminal to receive the DL data once and transmit the UL data once, respectively, is $2\tau_{tr}+2\tau_{com}$. Therefore, the length of the operating time period in the scheduler-scheme shown in FIG. 1 is expected to be about a half compared with that in the scheduler scheme shown in FIG. 20.

Figure 3:
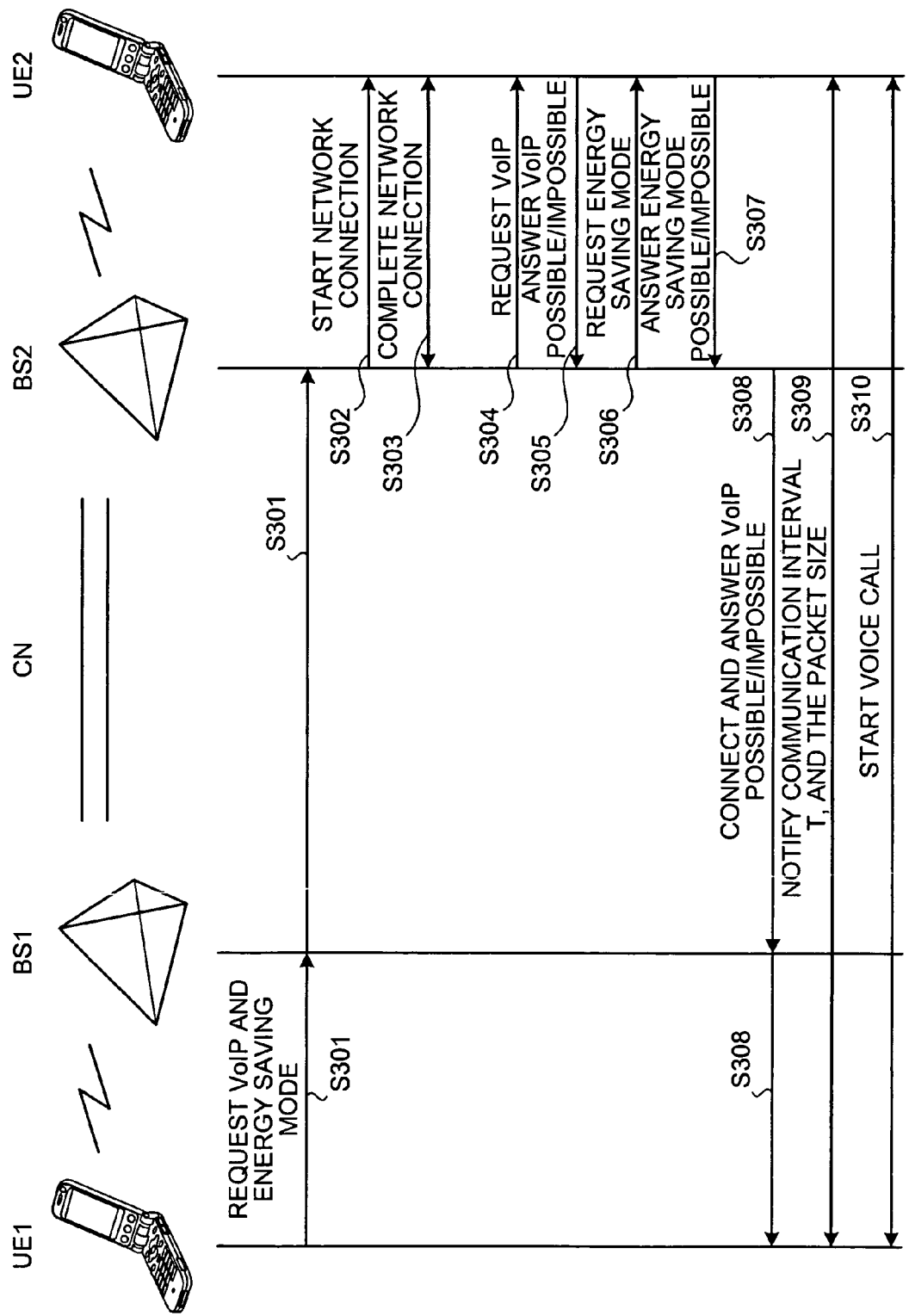
FIG. 3 is a sequence diagram of a call start processing of a communication system according to the embodiment.

FIG. 3 is a sequence diagram of a call start processing of a communication system according to the embodiment. In FIG. 3, UE1 and UE2 are the communication terminals (UE) of the communication system according to the present invention. Base Station (BS) 1 and BS2 are the base stations of the communication system according to the present invention. Here, a situation where UE1 wishes to make a voice call to UE2, and UE1 makes a voice call to UE2 through BS1 and BS2, is explained.

Here explained is the situation where communications between UE1 and BS1 and between UE2 and BS2, respectively, are by wireless means, but the communication between UE2 and BS2 may not be by wireless means but by wired means. BS1 and BS2 are connected with a Core Network (CN). The CN is a network that has a large capacity switchboard and high-speed transmission function.

As shown in FIG. 3, UE1 first transmits a request to BS1 and BS2 that it wants to make a voice call using VoIP service in an energy saving mode (step S301). By this step S301, BS1 can acquire the information that UE1 can use VoIP in the energy saving mode. Next, BS2 starts the processing of network connection with UE2 (step S302). When the network connection is completed and the communication with UE2 is established (step S303), BS2 transmits a VoIP request by VoIP to UE2 (step S304).

Next, UE2 answers BS2 whether it is capable of a VoIP call (step S305). Here explained is the situation where the answer that a VoIP call is possible. Next, BS2 transmits to UE2 a request that it wants to make the VoIP call in the energy saving mode (in the scheduler scheme according to the present invention) (step S306).

Next, UE2 answers BS2 whether it can make a call by VoIP in the energy saving mode (step S307). Then, BS2 answers to BS1 and UE1 that the connection with UE2 has completed and the call by VoIP is possible (step S308).

Next, UE1 and UE2 mutually specify Quality of Service (QoS) indexes, such as the communication interval T, a packet size, and an assigned frequency, through BS1 and BS2 (step S309). Then, they start a voice call with the scheduler scheme described above (step S310), and the call start processing of the communication system according to the present invention is finished.

Meanwhile, although here explained was a situation where BS2 transmits UE2 a VoIP request (step S304) and the energy saving mode request (step S306) one by one, these requests may be transmitted simultaneously. In this case, UE2 may transmit simultaneously a VoIP possible/impossible answer (step S305) and an energy saving mode possible/impossible answer (step S307).

A communication terminal according to a first embodiment realizes a scheduler scheme shown in FIG. 2 by synchronizing timings of UL data transmission and DL data reception. For example, the transmitting timing of the communication terminal is controlled based on the periodic reception timing of common information from BS1.

Figure 4:
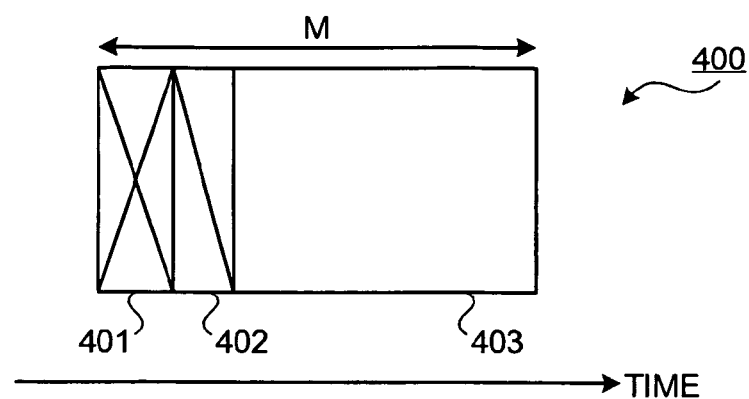
FIG. 4 is a schematic diagram for illustrating a frame format of DL data received by the communication terminal according to a first embodiment of the present invention.

FIG. 4 is a schematic diagram for illustrating a frame format of DL data received by the communication terminal according to a first embodiment of the present invention. As shown in FIG. 4, a frame 400 of the DL data consists of a pilot channel 401, a scheduler managing channel 402, and a data channel 403. The pilot channel 401 and the scheduler managing channel 402 are realized by common channels. The data channel 403 is realized by a channel assigned to a specific communication terminal by the scheduler.

The communication terminal detects timings using the pilot channel 401. The communication terminal also detects timings during the training periods 201 and 202 shown in FIG. 2. The communication terminal performs channel estimation using the pilot channel 401, and performs an adaptive modulation on the data channel 403. The communication terminal receives notices about the adaptive modulation and assignment situation of the communication terminal, through the scheduler managing channel 402.

The abscissa, time, is the time axis. Here, the pilot channel 401, the scheduler managing channel 402, and the data channel 403 are time-multiplexed in this order, but the order is not restricted to this. M is the frame length (the time required to receive a frame) of this frame.

Other than these channels, channels to transmit and receive Signal-to-Interference and Noise Ratio (SINR) information about propagation path quality required for the adaptive modulation, Channel Quality Indicator (CQI) information, Acknowledge (ACK) information concerning whether data were transmitted correctly required for retransmission control, and Not Acknowledge (NACK) information are also required, but the descriptions are omitted here.

Figure 5:
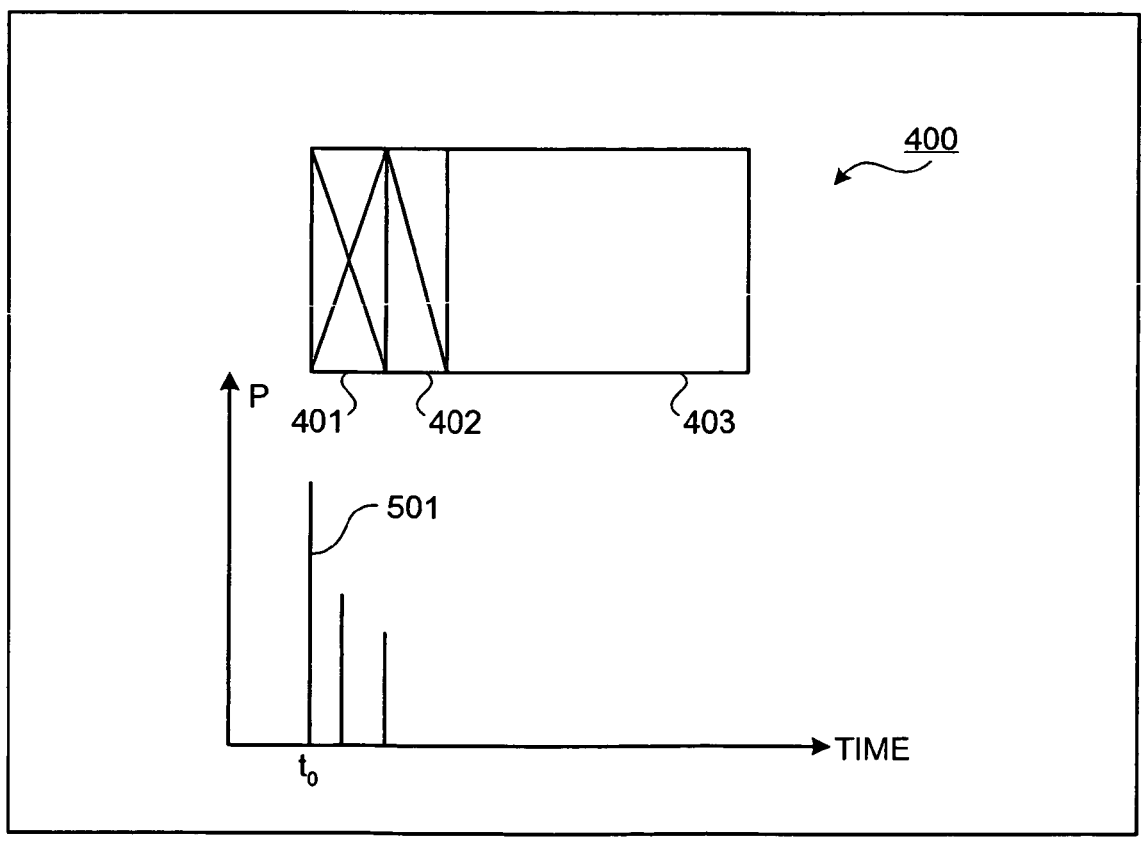
FIG. 5 is a schematic diagram of the DL data of which reception timing is detected by the communication terminal according to the first embodiment.

FIG. 5 is a schematic diagram of the DL data of which reception timing is detected by the communication terminal according to the first embodiment. As shown in FIG. 5, under multipath environment, simultaneously transmitted radio waves reach the communication terminal at several different timings via a plurality of paths. Here, focusing on a first wave 501 that propagates via the shortest path, the arrival time of the first wave 501 is set to $t_0$. The communication terminal judges the time $t_0$ during the training periods 201 and 202 shown in FIG. 2.

Figure 6:
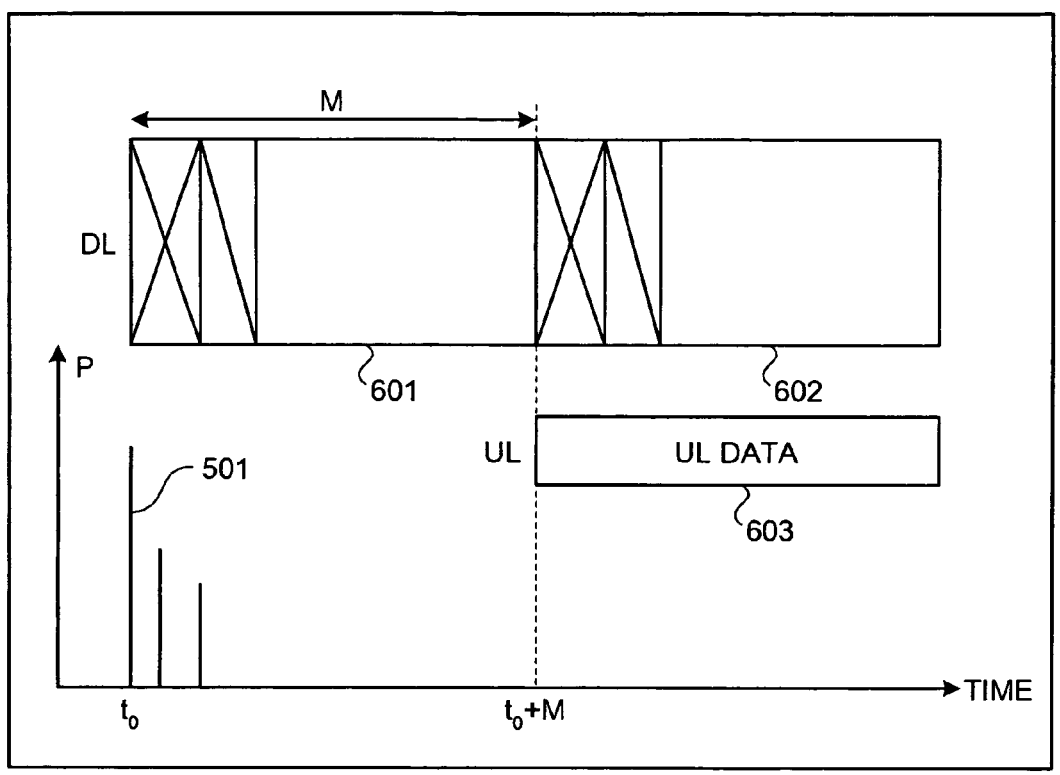
FIG. 6 is a schematic diagram for explaining the timing when the communication terminal according to the first embodiment transmits UL data.

FIG. 6 is a schematic diagram for explaining the timing when the communication terminal according to the first embodiment transmits UL data. In FIG. 6, frame 601 is a frame which the base station transmitted toward a communication terminal other than this communication terminal. This communication terminal judges based on the scheduler managing channel 402 in this frame 601, that frame 602 to be transmitted next is the frame transmitted toward this communication terminal.

Then, this communication terminal transmits UL data 603 at a time $t_0$+M, which is later than the arrival time $t_0$ of the first wave 501 of the frame 601 by the frame length M of frame 601. Thus, the timing when this communication terminal receives the frame 602 of the DL data and the timing when it transmits the UL data 603 coincide with each other.

Figure 7:
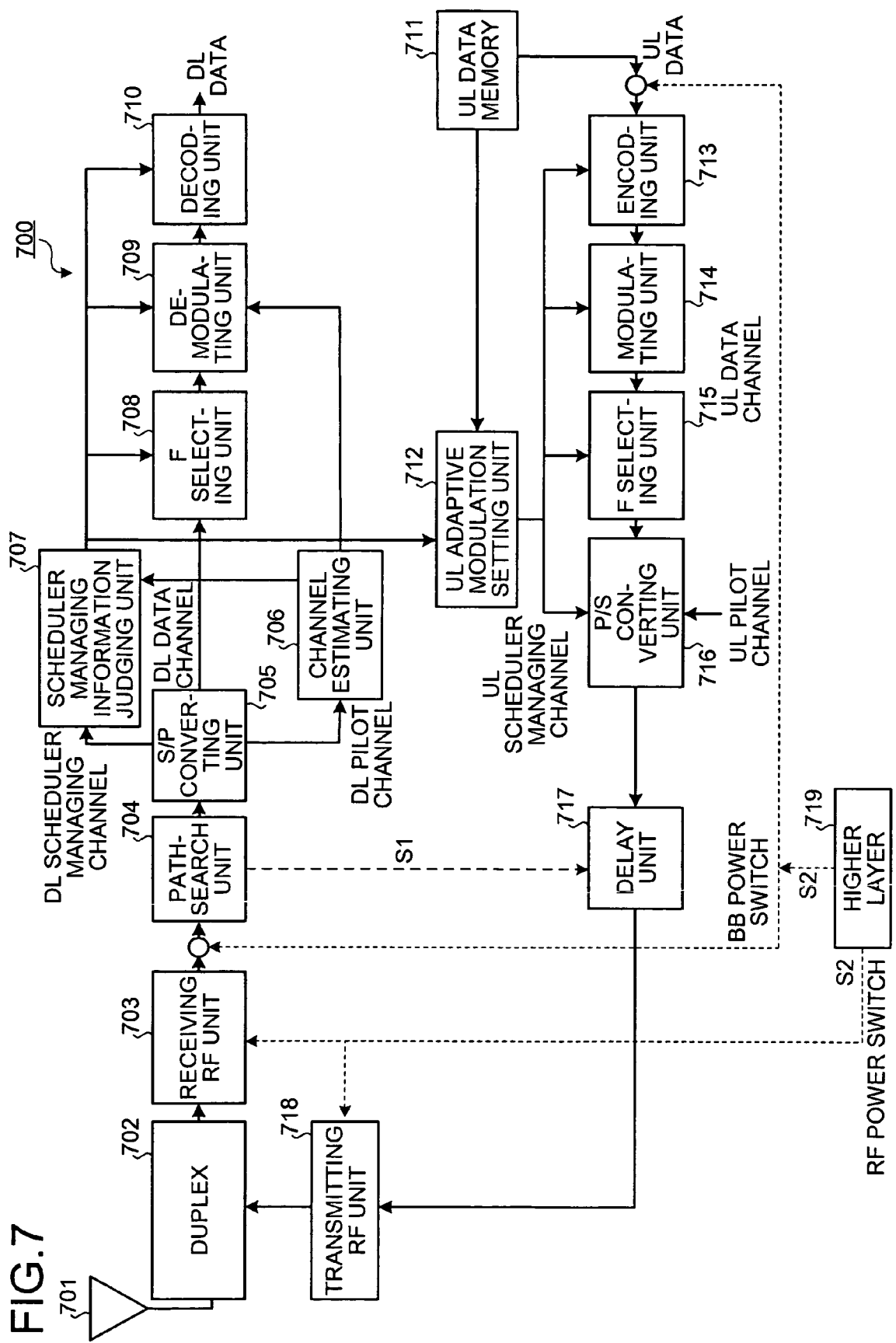
FIG. 7 is a block diagram of the communication terminal according to the first embodiment.

FIG. 7 is a block diagram of the communication terminal according to the first embodiment. As shown in FIG. 7, a communication terminal 700 includes: an antenna 701, a duplex 702, a receiving RF unit 703, a path-search unit 704, a S/P converting unit 705, a channel estimating unit 706, a scheduler managing information judging unit 707, an f selecting unit 708, a demodulating unit 709, a decoding unit 710, a UL data memory 711, a UL adaptive modulation setting unit 712, an encoding unit 713, a modulating unit 714, an f selecting unit 715, a P/S converting unit 716, a delay unit 717, a transmitting RF unit 718, and a higher layer 719.

The duplex (an antenna branching filter) 702 separates the signals that the antenna 701 transmits to and receives from the base station, into the UL data and the DL data. The duplex 702 outputs the DL data to the receiving RF unit 703.

The receiving RF unit 703 down-converts the DL data outputted from the duplex 702 to Base Band (BB) signals. The receiving RF unit 703 outputs the BB signals to the path-search unit 704.

The path-search unit 704 detects reception of the first wave 501 in the multi-path by a correlation computation with a pilot known beforehand. The path-search unit 704 performs this detection also during the training periods 201 and 202. To detect the first wave 501 of the path, a known detecting method that uses such as the time correlation with the pilot, is utilized. The path-search unit 704 notifies the information S1 about the arrival time t0 of the first wave 501 to the delay unit 717.

The serial/parallel (S/P) converting unit 705 separates the DL data into the DL pilot channel, the DL scheduler managing channel, and the DL data channel according to the timing of the first wave 501 detected by the path-search unit 704. For example, the DL data are orthogonal time multiplexing of each channel, and the S/P converting unit 705 orthogonally separates these DL data.

The channel estimating unit 706 performs channel estimation using the DL pilot channel separated by the S/P converting unit 705, and estimates change of the radio-wave-propagation path. The channel estimating unit 706 performs channel estimation, and outputs estimation results to the scheduler managing information judging unit 707 that processes the DL scheduler managing channel and the demodulating unit 709 that processes the DL data channel. The scheduler managing information judging unit 707 and the demodulating unit 709 compensates the propagation path change using this estimation result, respectively.

The scheduler managing information judging unit 707 judges whether the DL data are assigned to the communication terminal 700 based on the data of the DL scheduler managing channel modulated and decoded with a predetermined scheme. When the DL data are assigned to the communication terminal 700, the scheduler managing information judging unit 707 acquires from these data, the information on the frequency band assigned to the DL data channel, and the information about the modulation and encoding for the DL data channel. The scheduler managing information judging unit 707 outputs the information about the frequency band to the f selecting unit 708. The scheduler managing information judging unit 707 also outputs the information about the modulation to the demodulating unit 709 and the information about the encoding to the decoding unit 710.

The scheduler managing information judging unit 707 acquires from the DL scheduler managing channel the information about the UL area allocation unit (not shown) controlled by the server on the CN or by the BS, and judges whether the received DL data are assigned to the communication terminal 700. Further, when the transmission frame is assigned to the communication terminal 700, the scheduler managing information judging unit 707 acquires the information about at what frequency and what amount of data the UL data can be transmitted, the information about the frequency assigned to the UL 102, and the information about the encoding method, and outputs these information to the UL adaptive modulation setting unit 712.

The f selecting unit 708 extracts the DL data from the DL data channel based on the information on the frequency band outputted from the scheduler managing information judging unit 707. The f selecting unit 708 outputs the extracted DL data to the demodulating unit 709.

The demodulating unit 709 demodulates the DL data outputted from the f selecting unit 708 to the code signals, based on the information about the modulation outputted from the scheduler managing information judging unit 707, and on the estimated result outputted from the channel estimating unit 706. The demodulating unit 709 outputs the code signals to the decoding unit 710.

The decoding unit 710 decodes the code signals outputted from the demodulating unit 709 to the original DL data, based on the information about encoding outputted from the scheduler managing information judging unit 707.

The UL data memory 711 stores the UL data which the communication terminal 700 transmits to other communication terminals through the BS. The UL data memory 711 outputs the information on the amount of the stored UL data to the UL adaptive modulation setting unit 712. The UL data memory 711 also outputs the stored UL data to the encoding unit 713.

The UL adaptive modulation setting unit 712 determines the optimal adaptive modulation scheme based on the information outputted from the scheduler managing information judging unit 707 about at what frequency and what amount of the UL data can be transmitted, and on the amount of the UL data outputted from the UL data memory 711, and outputs the information on this adaptive modulation scheme to the modulating unit 714 and the P/S converting unit 716. The UL adaptive modulation setting unit 712 also outputs the information on the frequency assigned to the UL 102 to the f selecting unit 715. The UL adaptive modulation setting unit 712 further outputs the information on the UL data encoding method to the encoding unit 713. The channel which outputs the information on the adaptive modulation scheme to the P/S converting unit 716 from this UL adaptive modulation setting unit 712 is denoted by a UL scheduler managing channel.

The encoding unit 713 encodes the UL data outputted from the UL data memory 711 based on the information on the encoding method outputted from the UL adaptive modulation setting unit 712. The encoding unit 713 outputs the encoded UL data to the modulating unit 714.

The modulating unit 714 modulates the UL data encoded and outputted by the encoding unit 713, based on the information on the adaptive modulation scheme outputted from the UL adaptive modulation setting unit 712. The modulating unit 714 outputs the modulated UL data to the f selecting unit 715.

The f selecting unit 715 applies the frequency based on the information outputted from the UL adaptive modulation setting unit 712 to the UL data modulated and outputted by the modulating unit 714, and outputs it to the P/S converting unit 716. Meanwhile, the channel consisting of the encoding unit 713, the modulating unit 714, and the f selecting unit 715, and through which the UL data pass, is denoted by a UL data channel.

The P/S converting unit 716 orthogonally time-multiplexes the UL data channel, the UL pilot channel for channel estimation, and the UL scheduler managing channel with which the UL adaptive modulation setting unit 712 outputs the information on the adaptive modulation scheme, and outputs them to the delay unit 717 as the UL data. Here, since the frame format is not restricted to the one described above, the P/S converting unit 716 that carries out orthogonal time multiplexing may be substituted by other circuits.

The delay unit 717 outputs the UL data outputted from the P/S converting unit 716 to the transmitting RF unit 718. The delay unit 717 adjusts the timing to output the UL data to the transmitting RF unit 718, based on the information Si about to notified by the path-search unit 704. That is, since the frame format explained in FIG. 5 is already known in the communication system, the delay unit 717 can estimate that it will receive the head of the following frame after a lapse of predetermined time from the arrival time $t_0$ of the first wave 501. The delay unit 717 outputs the UL data to the transmitting RF unit 718 according to the estimated time to receive the head of the following frame. This enables to adjust the timing to transmit actually the UL data to the BS, and to synchronize it with the timing to receive the DL data from the BS.

The transmitting RF unit 718 up-converts the UL data outputted from the delay unit 717, and outputs them to the duplex 702. The UL data outputted to the duplex 702 are transmitted to the BS through the antenna 701. According to the configuration explained above, the communication terminal 700 neither receives the DL data nor transmits the UL data actually in the training periods 201 and 202 shown in FIG. 2, but determines the UL data transmission timing and generates the UL data.

When the timings of the DL and the UL coincide with each other as shown in FIG. 1, the higher layer 719 makes the communication terminal 700 shift to the sleep mode during the period when signal processing is not necessary, by controlling the RF power switch and the BB power switch by means of a control signal S2. The higher layer 719 also controls to start the communication terminal 700 just before the DL or the UL.

Figure 8:
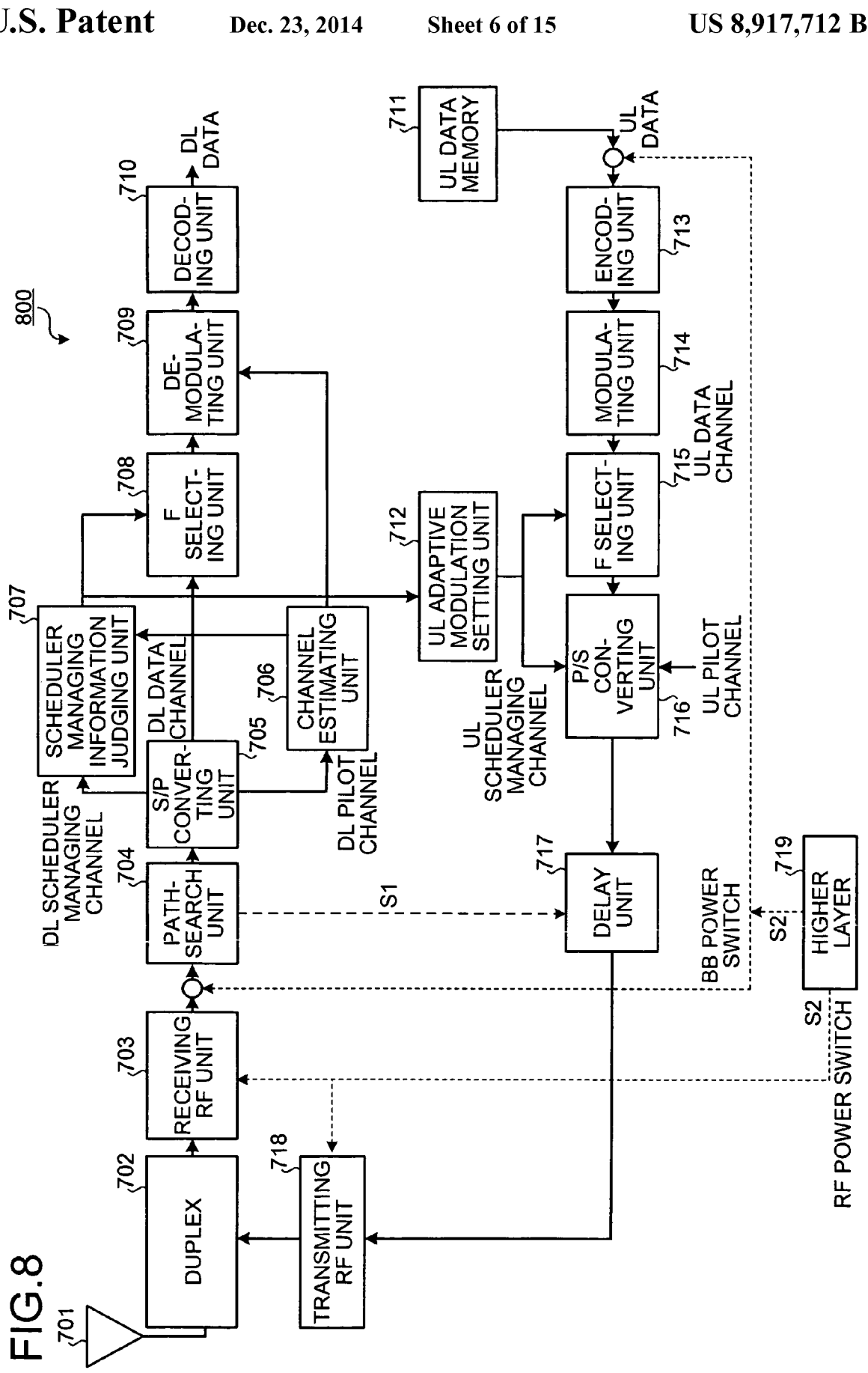
FIG. 8 is a block diagram of another configuration of the communication terminal according to the first embodiment.

FIG. 8 is a block diagram of another configuration of the communication terminal according to the first embodiment. In FIG. 8, the same numerals are attached to the same units as those in the configuration of the communication terminal 700 in FIG. 7, and the description is omitted. In a communication terminal 800 shown in FIG. 8, the encoding method and the modulating/demodulating method are fixed. In VoIP which allows periodical communication in both directions, the amount of data transfer in a fixed time period is close to that determined by the communication interval and the packet size which the higher layer 719 determines, so that the encoding method and the modulating/demodulating method can be fixed based on this data amount.

This enables to decrease the data amount of the DL scheduler managing channel and of the UL scheduler managing channel, and the UL adaptive modulation setting unit 712 does not need to monitor the amount of the UL data accumulated in the UL data memory 711. Moreover, the scheduler managing information judging unit 707 and the UL adaptive modulation setting unit 712 do not need to output the information about the modulation explained in FIG. 7 to the demodulating unit 709 and to the modulating unit 714. The scheduler managing information judging unit 707 and the UL adaptive modulation setting unit 712 also do not need to output the information about the encoding explained in FIG. 7 to the decoding unit 710 and the modulating unit 714.

Figure 9:
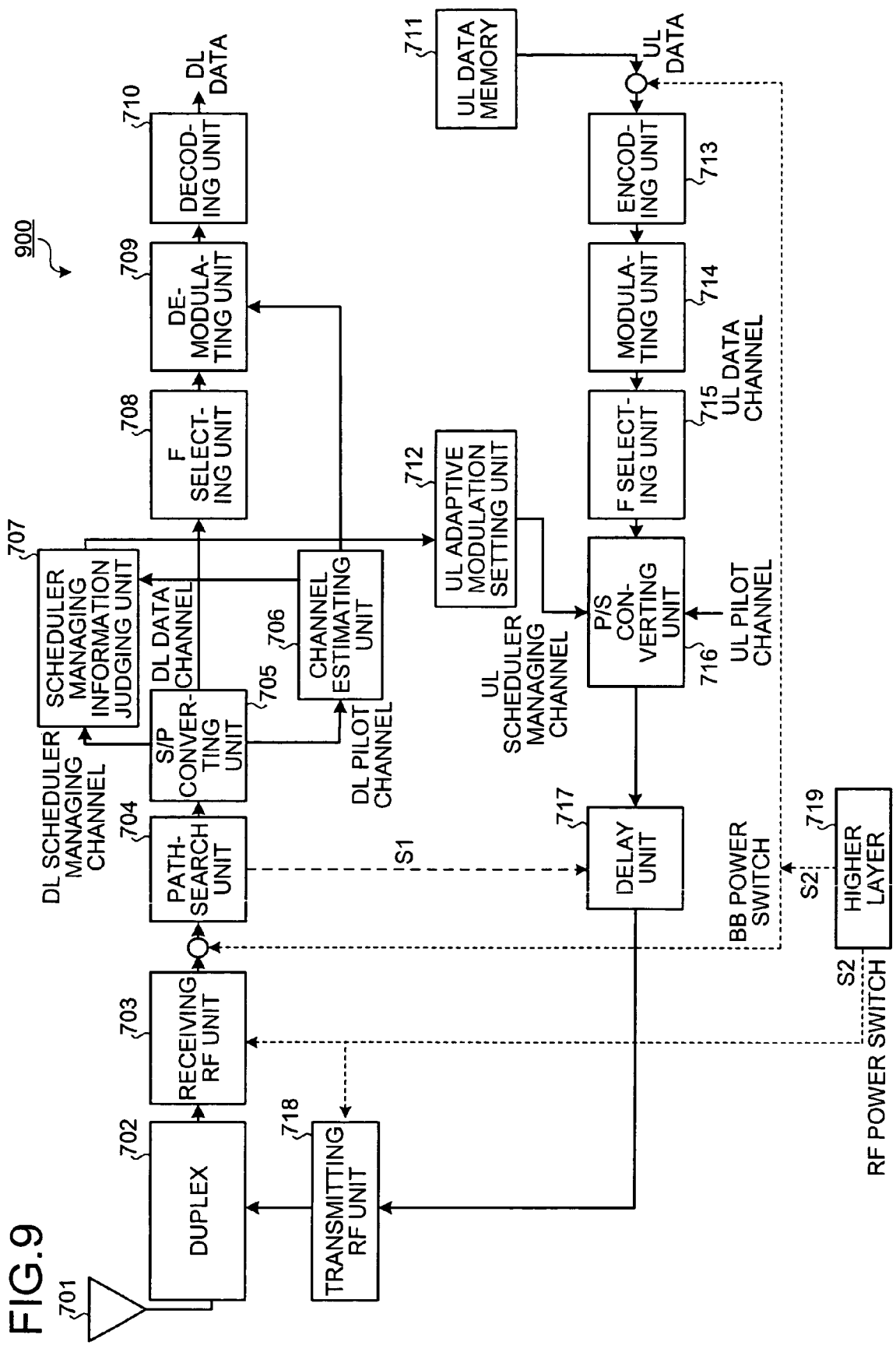
FIG. 9 is a block diagram of still another configuration of the communication terminal according to the first embodiment.

FIG. 9 is a block diagram of still another configuration of the communication terminal according to the first embodiment. In FIG. 9, the same numerals are attached to the same units as those in the configuration of the communication terminal 700 in FIG. 7, and the description is omitted. In a communication terminal 900 shown in FIG. 9, the frequency band with which it transmits and receives at the time of the initial setting and hand-over of the communication is fixed. In this case, since it can not choose the optimal frequency for transmission and reception, the frequency diversity gain decreases, but the data amount of the DL scheduler managing channel and the UL scheduler managing channel can be decreased. Moreover, the scheduler managing information judging unit 707 and the UL adaptive modulation setting unit 712 do not need to output the information on the frequency band explained in FIG. 7 to the f selecting unit 708 and the f selecting unit 715.

Figure 10:
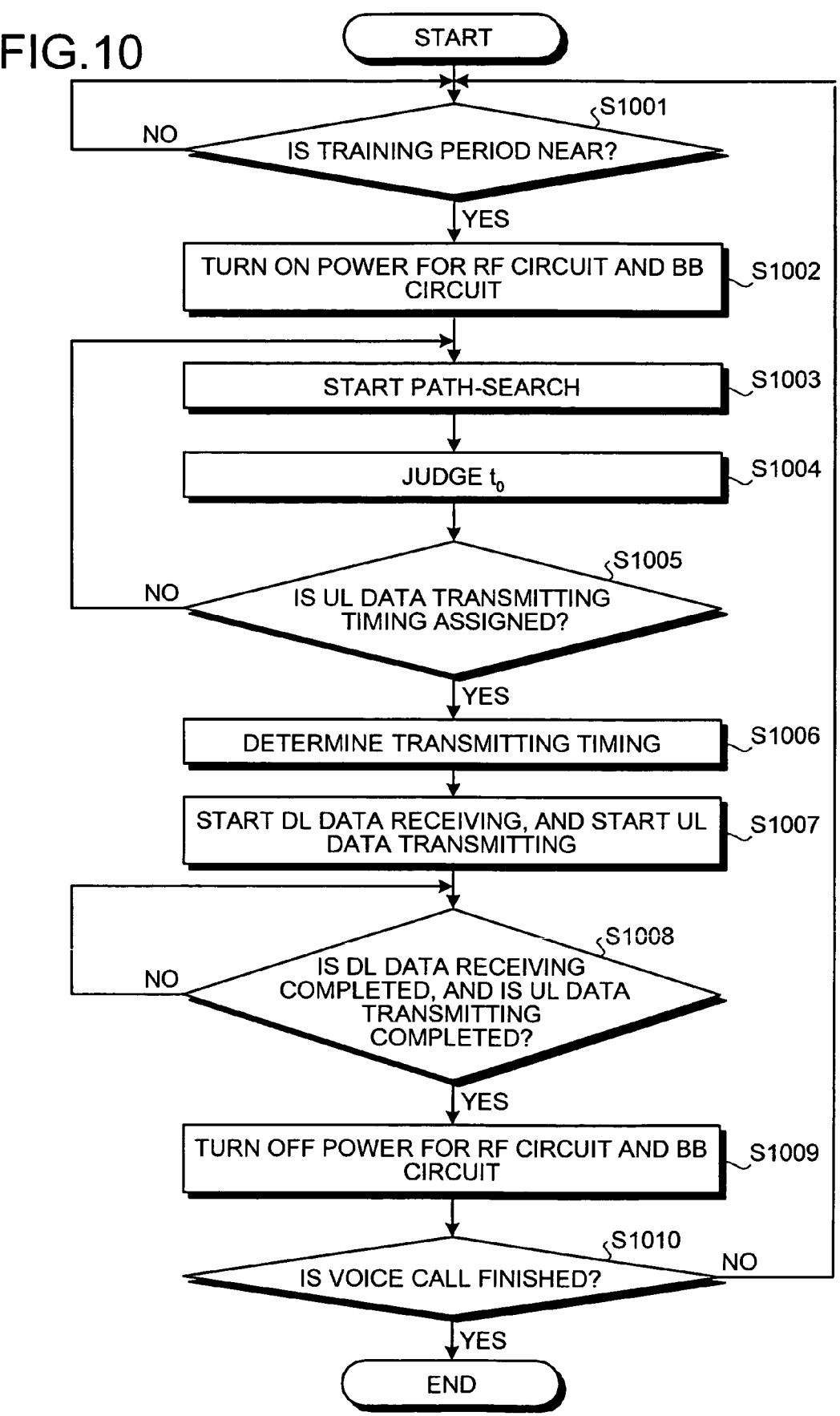
FIG. 10 is a flowchart of an operation of the communication terminal according to the first embodiment.

FIG. 10 is a flowchart of an operation of the communication terminal according to the first embodiment. As shown in FIG. 10, the communication terminal 700 (and also 800 and 900) first monitors the scheduler managing channel, and waits until the training periods 201 and 202 for the UL 102 and the DL 101 become near (step S1001: NO). If the training periods 201 and 202 come near (step S1001: YES), it turns ON the power supplies of the RF circuit and the BB circuit (step S1002). Next, it starts the path-search (step S1003) and judges the arrival time $t_0$ of the first wave 501 of the frame 601 shown in FIG. 6 (step S1004).

Next, it judges whether the UL data transmission timing is assigned to the scheduler managing channel (step S1005). If the UL data transmission timing is not assigned (step S1005: NO), it waits the following frame, and then returns to step S1003 to continue the processing. If the UL data transmission timing is assigned (step S1005: YES), it determines the transmission timing of the UL data based on the time t0 and the frame length M (see FIG. 6) (step S1006). Then, it starts to transmit the UL data at the transmission timing determined at step S1006 (step S1007). At step S1007, it starts to receive the DL data simultaneously with the start of the UL data transmission.

Next, the communication terminal waits until the reception of the DL data and the transmission of the UL data are completed (step S1008: NO loop). When the reception of the DL data and the transmission of the UL data are completed (step S1008: YES), it turns off the power supplies of the RF circuit and the BB circuit (step S1009). Next, it judges whether the voice call is finished (step S1010). If the voice call is not finished (step S1010: NO), it returns to step S1001 and continues the processing. When the voice call is finished (step S1010: YES), the communication terminal 700 finishes its series of operations.

According to the communication terminal, the base station, and the communication method according to the first embodiment explained above, the timings of the DL 101 and the UL 102 can be synchronized. This affects the communication terminal to be in the sleep mode longer and to reduce power consumption.

In a communication terminal according to a second embodiment, timings of UL data transmission and DL data reception are once synchronized, and then, a delay is given to the transmission timing of the UL data, so that the BS receives simultaneously the UL data transmitted from a plurality of communication terminals including the concerned communication terminal. If the timings of UL data received by the BS coincide with each other, the precision of the orthogonal separation between the UL data from the communication terminals in time, frequency, and space can be improved, and the cell throughput can be increased.

Figure 11:
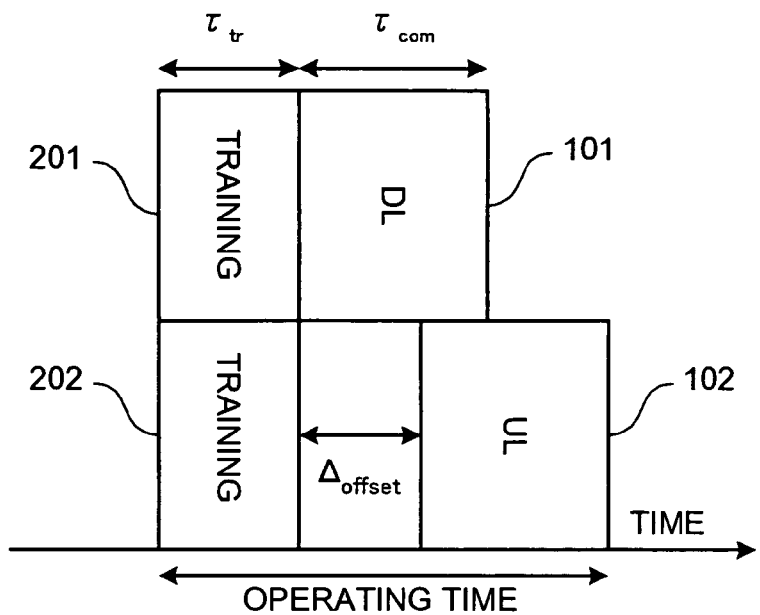
FIG. 11 is a detailed diagram of the DL and the UL shown in FIG. 1 in a second embodiment of the present invention.

FIG. 11 is a detailed diagram of the DL and the UL shown in FIG. 1 in a second embodiment of the present invention. As shown in FIG. 11, the communication terminal according to the second embodiment gives a delay $\Delta_{offset}$, between the training period 202 for the UL 102 and the period for the UL 102, after synchronizing the timing of the training period 201 for the DL 101 and the training period 202 for the UL 102. The BS feeds back to each communication terminal the information about the delay time required to synchronize the transmission timing of the UL data with those of other communication terminals so that each communication terminal can determine the value of this $\Delta_{offset}$.

Figure 12:
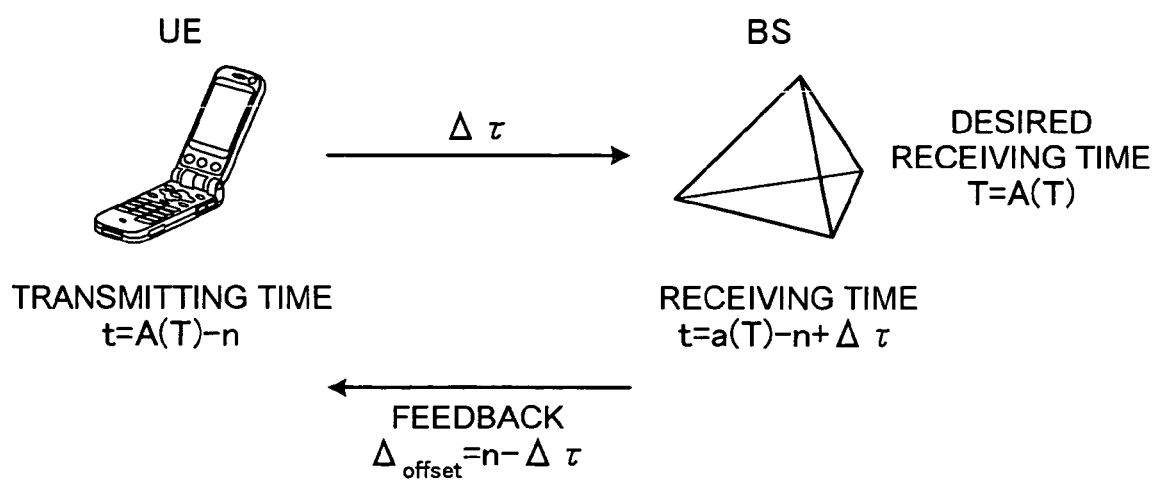
FIG. 12 is a schematic for explaining feedback of information on delay time performed by the base station with respect to the communication terminal.

FIG. 12 is a schematic for explaining feedback of information on delay time performed by the base station with respect to the communication terminal. As shown in FIG. 12, the desired reception time of the BS is set to $t=a(T)$. The $a(T)$ corresponds to the communication interval T shown in FIG. 1. If the UE transmits the UL data at the time earlier than $a(T)$ by n, $t=a(T)-n$, and the UL data transmitted from the UE takes $\Delta\tau$ to reach the BS, then the BS actually receives the UL data at $t=a(T)-n+\Delta\tau$.

In this case, the BS feeds back to the UE a request that the transmission time should be delayed by $n-\Delta\tau$, using such as the scheduler managing channel. From this, the UE knows that it should set the delay $\Delta$offset to be $n-\Delta\tau$.

If the BS feeds back the information about this delay time to the UE during the training period for following the UL 102, the operating time of the UE does not increase, so that the reception timings for the UL 102 can be synchronized without increasing power consumption of the UE.

Figure 13:
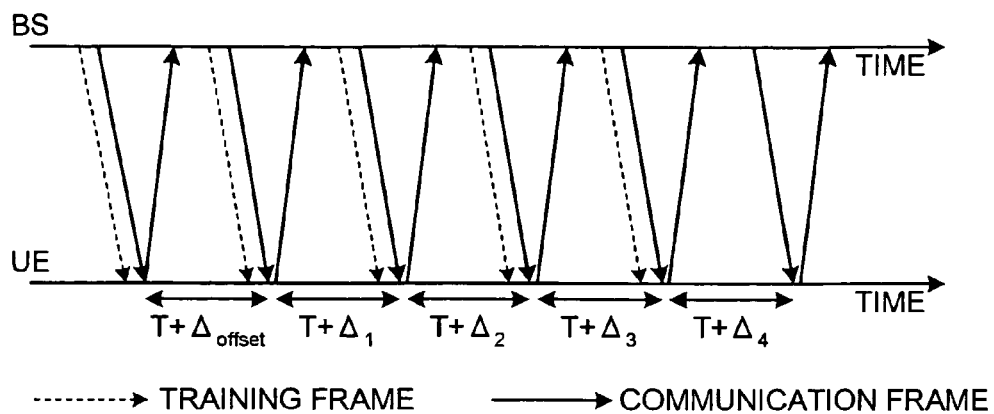
FIG. 13 is a schematic diagram for explaining a situation where the communication terminal makes a call while receiving in parallel the feedback from the base station.

FIG. 13 is a schematic diagram for explaining a situation where the communication terminal makes a call while receiving in parallel the feedback from the base station. In FIG. 13, dotted lines correspond to training frames (frame 601 in FIG. 6), and continuous lines correspond to communication frames (the frame 602 in FIG. 6, the DL data or the UL data). The communication terminal transmits at first the UL data at the same time with the DL data reception. The communication terminal delays the UL data transmission timing for the second and later DL data receptions, based on $\Delta_{offset}$ information transmitted from the base station.

As shown in FIG. 13, the communication interval T, with which the communication terminal and the base station transmit and receive data, changes in the way, $T+\Delta_{offset}$, $T+\Delta_1, \ldots$, $T+\Delta_4$, because the timing when the base station receives the UL data always changes, since the communication terminal moves around or the communication environment changes, or the like. Thus, the base station transmits to the communication terminal the $\Delta_{offset}$ information suitable at that time upon every data transmission and reception, and the communication terminal adjusts the delay $\Delta_{offset}$ whenever it receives the $\Delta_{offset}$ information.

Figure 14:
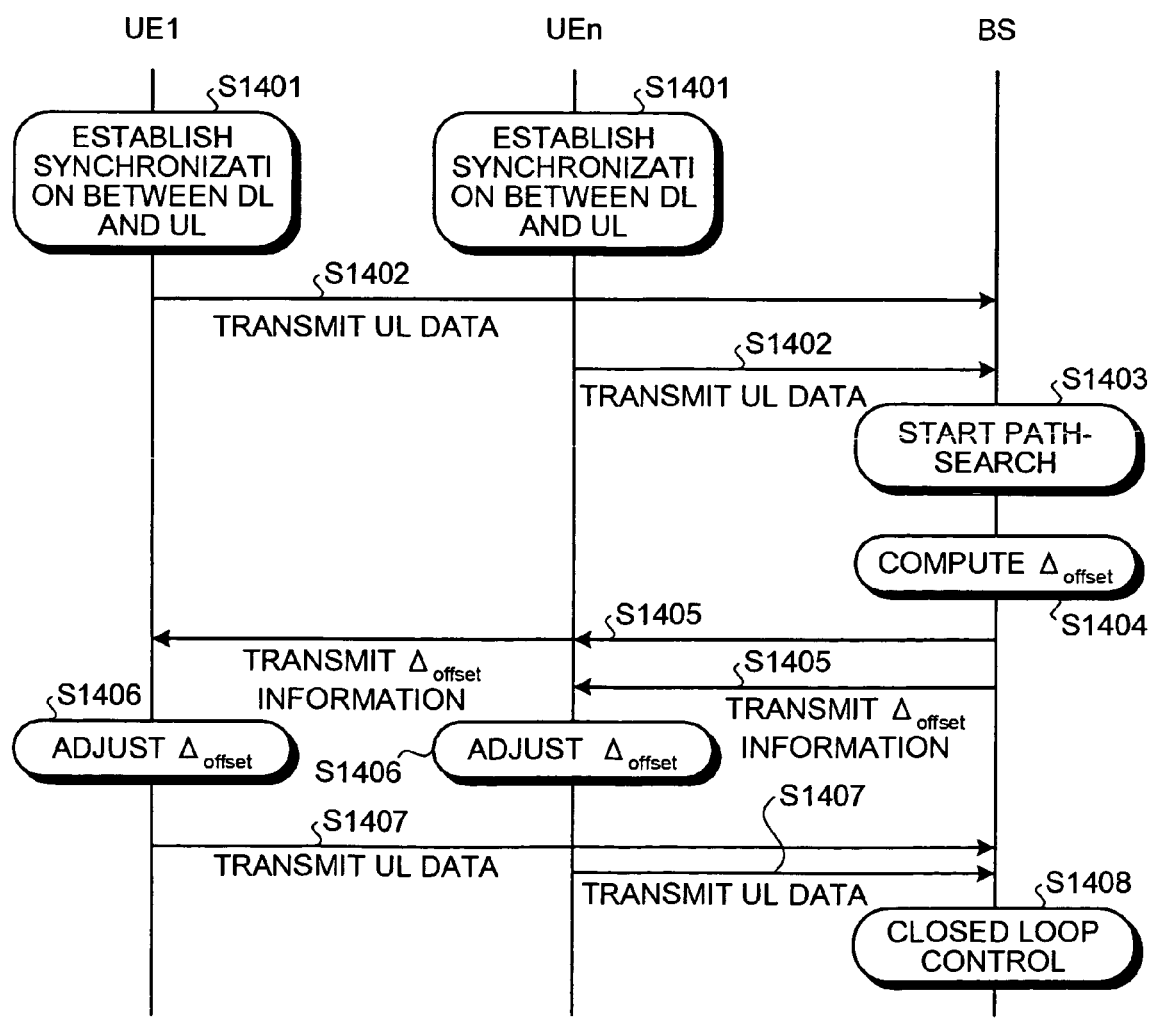
FIG. 14 is a sequence diagram of an operation of the base station to establish synchronization of the UL data received from a plurality of communication terminals.

FIG. 14 is a sequence diagram of an operation of the base station to establish synchronization of the UL data received from a plurality of communication terminals. In FIG. 14, UEn is a communication terminal different from UE1 shown in FIG. 3. UEn does not need to be the communication terminal with which UE1 wishes to make a call (UE2 in FIG. 3). Moreover, the communication terminals are not limited to two, UE1 and UEn, but may be three or more.

First, UE1 and UEn establish synchronization of the DL 101 and the UL 102 (step S1401) as explained in FIG. 10, and they transmit the UL data to the BS (step S1402). In this case, the UL data transmitted from UE1 and the UL data transmitted from UEn are not necessarily received simultaneously by the BS, but are typically received at different times by the BS.

Next, the BS starts a path-search on each of the UL data transmitted from UE1 and the UL data transmitted from UEn (step S1403). Then, the BS computes $\Delta_{offset}$ on each of the UL data transmitted from UE1 and transmitted from UEn according to the path-search at step S1403, from the difference between the arrival time $t_0$ of the first wave 501 and the desired reception timing, a(T) (step S1404). Next, the BS transmits the $\Delta_{offset}$ information about the $\Delta_{offset}$ computed on each of UE1 and UEn, to UE1 and UEn (step S1405).

Then, UE1 and UEn adjust the $\Delta_{offset}$ respectively, based on the $\Delta_{offset}$ information transmitted from the BS (step S1406) and transmit the subsequent UL data to the BS (step S1407). In this case, the UL data transmitted from UE1 and the UL data transmitted from UEn will be simultaneously received by the BS as a result of different $\Delta_{offset}$ adjustments by the individual users. Next, the BS performs a closed loop control to keep this synchronization (step S1408), and completes the operation to establish the synchronization of the receiving UL data.

Figure 15:
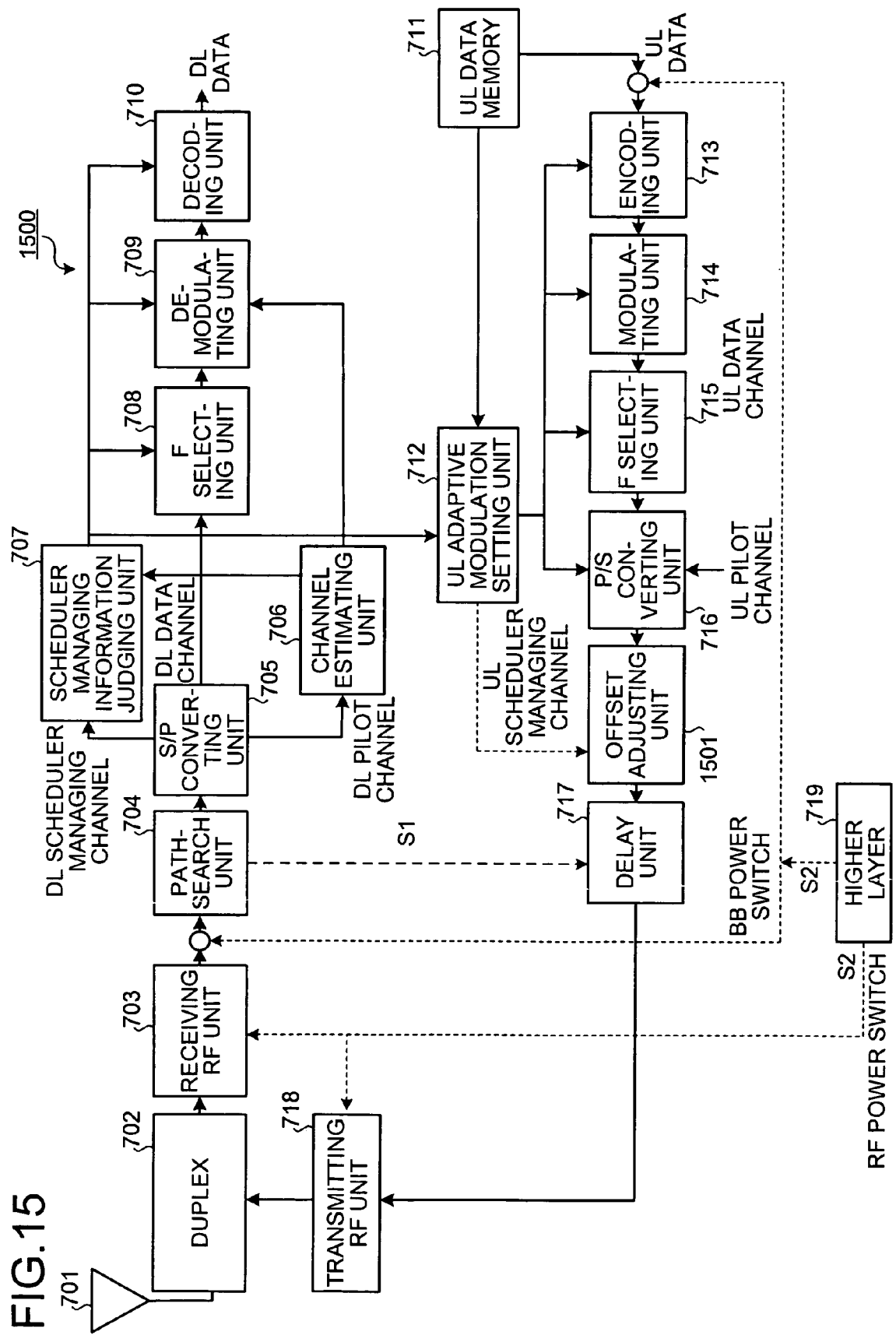
FIG. 15 is a block diagram of the communication terminal according to the second embodiment.

FIG. 15 is a block diagram of the communication terminal according to the second embodiment. In FIG. 15, the same numerals are attached to the same units as those in the configuration of the communication terminal shown in FIG. 7, and the description is omitted. A communication terminal 1500 according to the second embodiment has an offset adjusting unit 1501 between the P/S converting unit 716 and the delay unit 717. The scheduler managing information judging unit 707 of the communication terminal 1500 acquires the $\Delta_{offset}$ information transmitted from the base station through the DL scheduler managing channel, for example, and outputs it to the offset adjusting unit 1501 through the UL adaptive modulation setting unit 712.

Based on the $\Delta_{offset}$ information, which is outputted from the scheduler managing information judging unit 707 and passes through the UL adaptive modulation setting unit 712, the offset adjusting unit 1501 outputs the UL data, which is outputted from the P/S converting unit 716 to the delay unit 717 after a delay period of $\Delta_{offset}$. As a result, as shown in FIG. 11, delay $\Delta_{offset}$ exists between the training period 202 for the UL 102 and the period for the UL 102.

Figure 16:
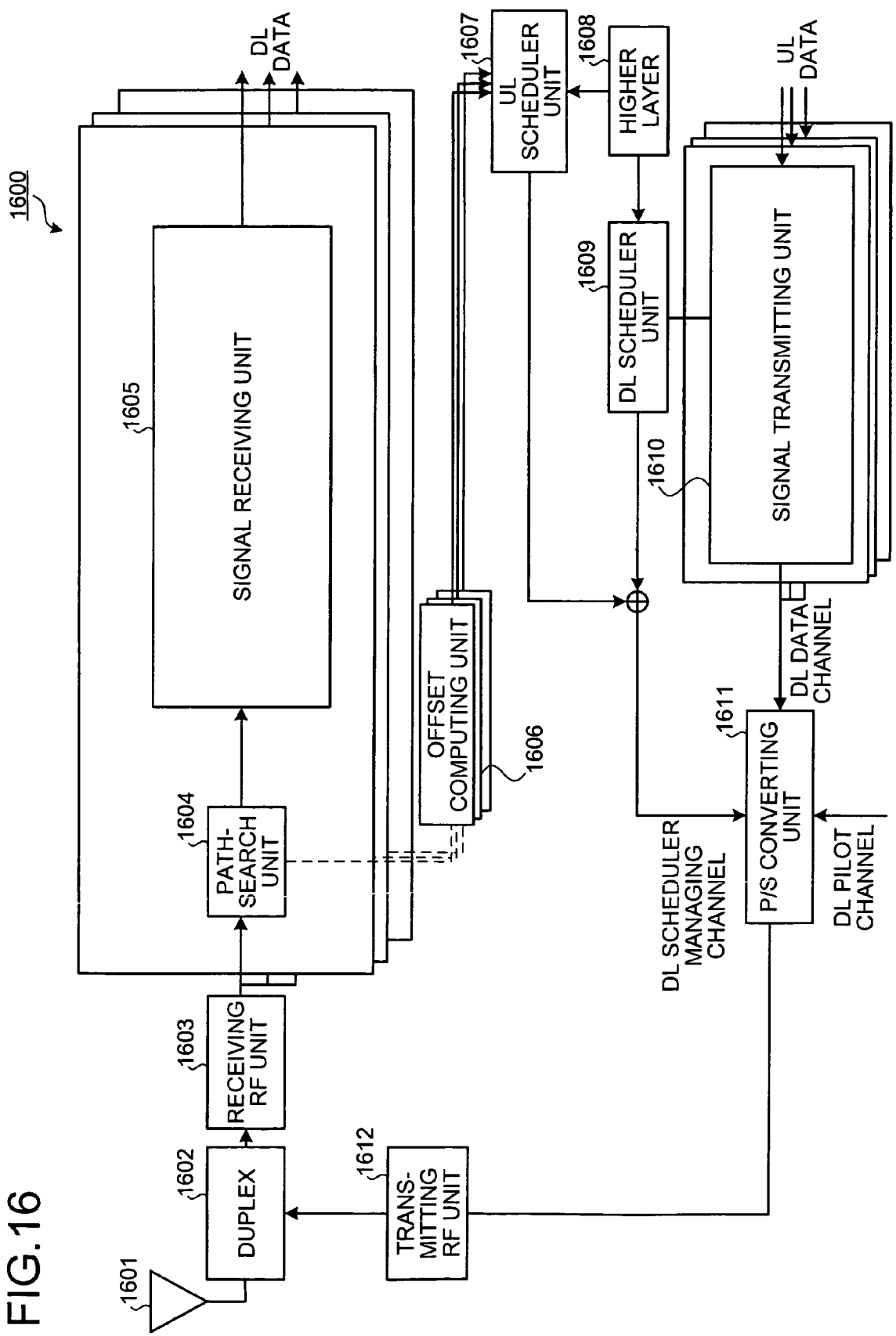
FIG. 16 is a block diagram of another configuration of the base station according to the second embodiment.

FIG. 16 is a block diagram of another configuration of the base station according to the second embodiment. As shown in FIG. 16, a base station 1600 has an antenna 1601, a duplex 1602, a receiving RF unit 1603, a path-search unit 1604, a signal receiving unit 1605, an offset computing unit 1606, a UL scheduler 1607, a higher layer 1608, a DL scheduler 1609, a signal transmitting unit 1610, a P/S converting unit 1611, and a transmitting RF unit 1612.

Since the antenna 1601, the duplex 1602, the receiving RF unit 1603, the path-search unit 1604, the P/S converting unit 1611, and the transmitting RF unit 1612 are the same as the antenna 701, the duplex 702, the receiving RF unit 703, the path-search unit 704, the P/S converting unit 716, and the transmitting RF unit 718 in the communication terminal 700, detailed descriptions are omitted.

The path-search unit 1604 performs a path-search on the UL data transmitted from the communication terminal 1500 and acquired through the antenna 1601, the duplex 1602, and the receiving RF unit 1603, and judges the arrival time, $t_0$, of the first wave 501 of the UL data. The path-search unit 1604 outputs the information about the judged $t_0$ to the offset computing unit 1606. The signal receiving unit 1605 corresponds to the S/P converting unit 705, the channel estimating unit 706, the scheduler managing information judging unit 707, the f selecting unit 708, the demodulating unit 709, and the decoding unit 710 in FIG. 7, and detailed descriptions are omitted here.

The offset computing unit 1606 computes the value of the $\Delta_{offset}$ based on the information about to outputted from the path-search unit 1604. That is, the offset computing unit 1606 computes $\Delta_{offset}$ from the difference between the arrival time, $t_0$, of the first wave 501 of the UL data and the desired reception timing, a(T) (see FIG. 12). The offset computing unit 1606 outputs the information about the computed $\Delta_{offset}$ to the UL scheduler 1607. There are a plurality of the path-search units 1604, the signal receiving units 1605, and the offset computing units 1606, respectively, and they process in parallel the UL data transmitted from a plurality of the communication terminals 1500.

The higher layer 1608 outputs to the UL scheduler 1607 pieces of transmission allocation information for each of the communication terminals 1500 and the adaptive modulation information and the frequency assignment information needed for transmission of the UL data. DL scheduler managing channel is formed by unifying the information outputted to the UL schedulers 1607 with the information of the DL scheduler 1609. The DL data for the communication terminals 1500 are modulated by the signal transmitting unit 1610 with the modulation scheme specified by the higher layer 1608.

The P/S converting unit 1611 orthogonally time-multiplexes the DL data modulated by the signal transmitting unit 1610, the DL pilot channel, and the DL scheduler channel, but the method of multiplexing is not restricted to this, as mentioned above. The offset information outputted to the UL scheduler 1607 is transmitted to the communication terminal through the P/S converting unit 1611, the transmitting RF unit 1612, the duplex 1602, and the antenna 1601.

Figures 17, 18:
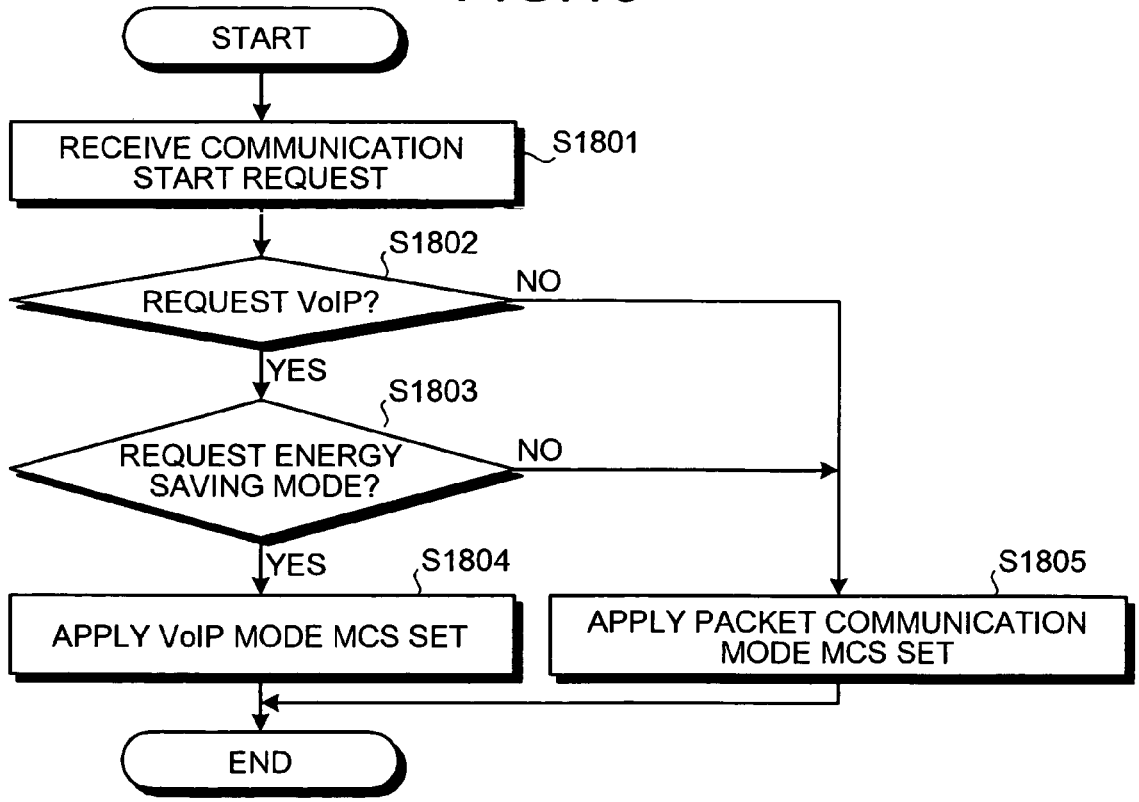
FIG. 17 is a schematic diagram of an adaptive modulation map in a communication system according to the second embodiment.
FIG. 18 is a flowchart of an operation of the base station according to the second embodiment to switch between a packet communication mode and a VoIP mode.

FIG. 17 is a schematic diagram of an adaptive modulation map in a communication system according to the second embodiment. As shown in FIG. 17, the communication mode of this system is selected between a packet communication mode and VoIP mode by the higher layer 1608. For example, when 6 bits are provided by the DL scheduler managing channel for the information to discriminate the modulation scheme (Modulation and Coding Scheme: MCS), 64 kinds of modulation schemes, MCS1 to MCS64, can be expressed in the packet communication mode.

On the other hand, in VoIP mode, the rate alteration range is narrow and the number of modulation schemes can be reduced. For example, when only 3 bits are provided for discrimination of the modulation schemes to express 8 kinds of modulation schemes, MCS1 to MCS8, the remaining 3 bits can be assigned to the information about $\Delta_{offset}$ described above. Here, eight kinds of $\Delta_{offset}$ values, 0, T/8, . . . , 7T/8, can be expressed.

As explained in FIGS. 8 and 9, the data amount of control signals used by the DL scheduler channel can be reduced by fixing the modulation scheme, the encoding method, or the assigned frequency. The information about $\Delta_{offset}$ may be assigned to the bits remained by such procedures. Thus, in VoIP mode, the base station 1600 can transmit the information about $\Delta_{offset}$ to synchronize the UL reception timing without increasing the information amount of the DL scheduler channel, by transmitting it together with VoIP mode MCS information.

FIG. 18 is a flowchart of an operation of the base station according to the second embodiment to switch between a packet communication mode and a VoIP mode. As shown in FIG. 18, the base station 1600 first receives a communication start request from the communication terminal 1500 (step S1801). This step S1801 corresponds to step S301 explained in FIG. 3.

Next, based on the communication start request received at step S1801, the base station judges whether the communication terminal 1500 requests a VoIP call (step S1802). When the communication terminal 1500 requests the VoIP call (step S1802: YES), the base station judges whether the communication terminal 1500 requests the VoIP call in the energy saving mode, based on the communication start request received at step S1801 (step S1803).

When the communication terminal 1500 requests the VoIP call in the energy saving mode at the step S1803 (step S1803: YES), the base station applies the MCS set for VoIP mode to the adaptive modulation map (step S1804), and finishes the mode switching operation. When the communication terminal 1500 does not request a VoIP call at step S1802 (step S1802: NO) and when the communication terminal 1500 does not request the VoIP call in the energy saving mode at the step S1803 (step S1803: NO), the base station applies the usual MCS set (the set for the packet communication mode in FIG. 17) to the adaptive modulation map (step S1805), and finishes the mode switching operation.

According to the communication terminal 1500, the base station 1600, and the communication method according to the second embodiment explained above, the reception timings of the UL data transmitted to the base station 1600 from a plurality of the communication terminals 1500 can be synchronized. This improves the precision of the orthogonal separation between the communication terminals in time, frequency, and space, and has an effect to improve the cell throughput.

In the second embodiment mentioned above, the base station 1600 computes $\Delta_{offset}$ based on the arrival time $t_0$ of the first wave 501 of the UL data transmitted from the communication terminal 1500 to synchronize the reception timings of the UL data transmitted to the base station 1600 from the communication terminals 1500, but the method to synchronize the reception timings is not restricted to this.

In each embodiment mentioned above, the communication interval T and the packet size are specified before the initiation of a voice call. However, when the communication terminal moves around or the communication environments changes and the call quality (the error characteristics and the communication delay) deteriorates during the voice call, an improvement of the call quality can be done by shortening the communication interval T or by making the packet size larger.

Figure 19:
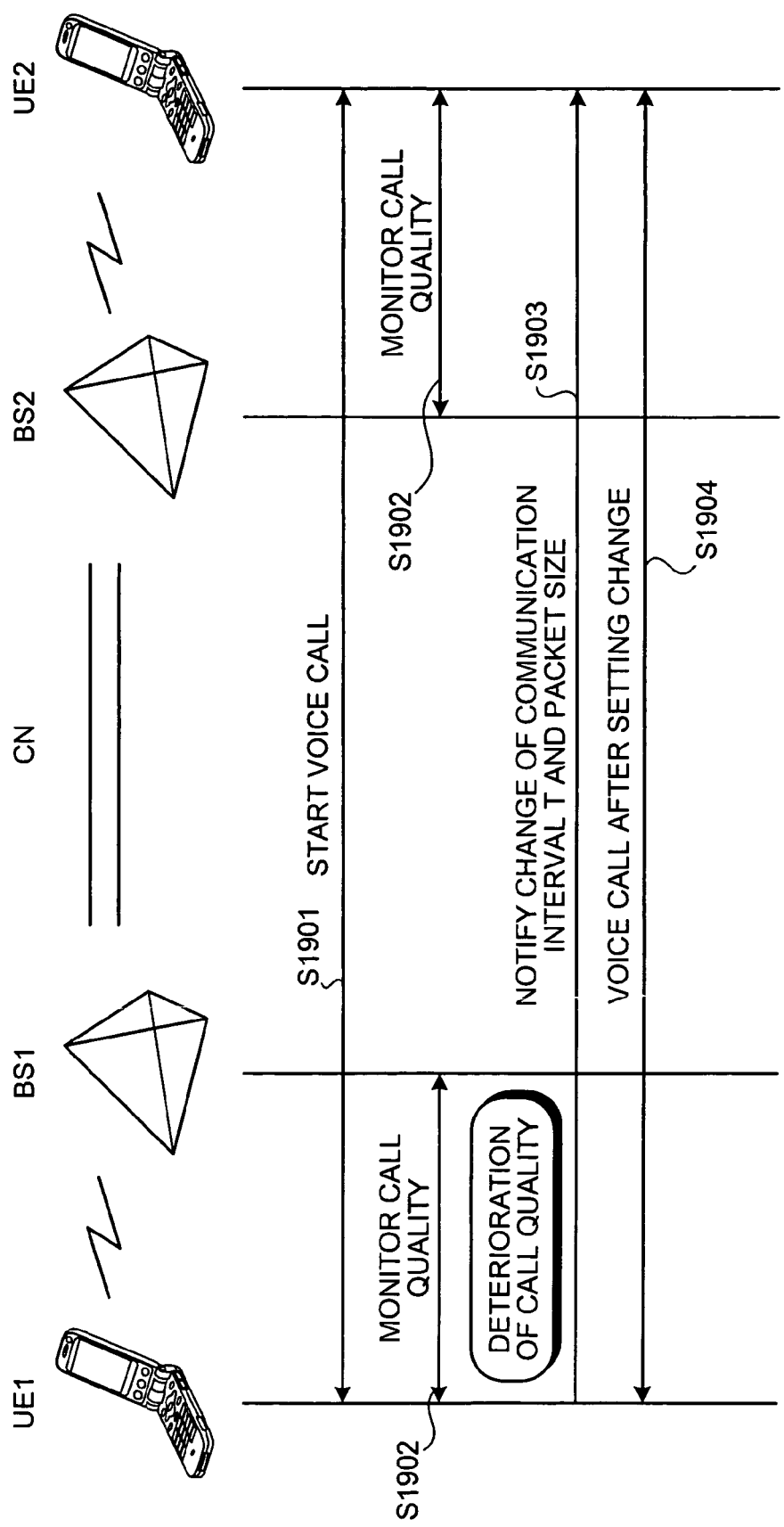
FIG. 19 is a sequence diagram of a call setting change operation of a communication system according to a third embodiment of the present invention.

FIG. 19 is a sequence diagram of a call setting change operation of a communication system according to a third embodiment of the present invention. As shown in FIG. 19, UE1 and UE2 first start a voice call through BS1, CN, and BS2 (step S1901, corresponding to step S310 in FIG. 3). Then, the call quality is monitored between UE1 and BS1, and between BS2 and UE2, respectively (step S1902). Here, suppose, for example, that the call quality between UE1 and BS1 is deteriorated by the change of such-as the communication environment.

In this case, UE1 or BS1 notifies BS2 and UE2 that the communication interval T and the packet size are changed (step S1903). Next, UE1 and UE2 change the communication interval T and packet size in the voice call (step S1904), and the call setting change operation is finished.

In each embodiment mentioned above, the examples in which the present invention was applied to VoIP were explained, but the present invention can also be applied to bidirectional communications other than VoIP using different frequencies between transmission and reception. For example, the present invention is applicable to games, videophones, and the like, having the communication facility.

As explained above, it is possible to make the time period of the communication terminal in the sleep mode longer, thereby reducing power consumption. Moreover, it is possible to improve the precision of the orthogonal separation between the communication terminals in time, frequency, and space, thereby improving the cell throughput.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication terminal that performs bidirectional communication using different frequencies for transmission and reception, comprising:
    a receiving unit receives a reception signal that is transmitted from a base station at a constant interval;
    a detecting unit detects a reception start time comprising an arrival time of a first wave of a pilot channel of a reception period during which the reception signal is received by the receiving unit, and also detects an assignment of a transmission opportunity and a reception opportunity;
    an adjusting unit adjusts, by offsetting the arrival time, a transmission start time of a transmission period during which a transmission signal is to be transmitted, so that the transmission start time coincides with the reception start time; and
    a transmitting unit starts a transmission of the transmission signal to the base station at the adjusted transmission start time, wherein
    according to the assignment of the transmission opportunity and the reception opportunity, the receiving unit receives the reception signal and the transmitting unit transmits the transmission signal at the same time based on the adjusted transmission start time.

2. The communication terminal according to claim 1, further comprising:
    a mode switching unit switches the communication terminal to an energy saving mode, when the receiving unit is not receiving the reception signals and the transmitting unit is not transmitting the transmission signals.

3. The communication terminal according to claim 1, wherein the adjusting unit adjusts the transmission period based on the reception period and a frame length of the reception signal.

4. The communication terminal according to claim 1, wherein the detecting unit detects the reception period during a training period before the receiving unit receives the reception signal.

5. The communication terminal according to claim 1, wherein the adjusting unit delays the transmission period based on information transmitted from the base station, the information indicating that the transmission period should be delayed.

6. The communication terminal according to claim 2, wherein the transmitting unit transmits a request for a voice call in the energy saving mode to a destination communication terminal.

7. The communication terminal according to claim 1, further comprising:
 a determining unit determines settings relating to communication quality based on a state of communication with the base station, wherein the transmitting unit notifies the settings to a destination communication terminal.

8. A communication method of a communication terminal that performs bidirectional communication using different frequencies for transmission and reception, comprising:
 receiving a reception signal that is transmitted from a base station at a constant interval;
 detecting a reception start time comprising an arrival time of a first wave of a pilot channel of a reception period during which the reception signal is received, and also detecting an assignment of a transmission opportunity and a reception opportunity;
 adjusting, by offsetting the arrival time, a transmission start time of a transmission period during which a transmission signal is to be transmitted, so that the transmission start time coincides with the reception start time; and
 starting a transmission of the transmission signal to the base station at the adjusted transmission start time, wherein
 according to the assignment of the transmission opportunity and the reception opportunity, the communication terminal receiving the reception signal and transmitting the transmission signal at the same time based on the adjusted transmission start time.

9. The communication terminal according to claim 6, further comprising:
 a setting unit sets up of a voice over internet protocol communication in the energy saving mode if the destination communication terminal can make a call in the energy saving mode.

10. The communication terminal according to claim 1, wherein
 the adjusting unit adjusts the transmission period of the transmission signal so that the transmission period continually coincides with the reception period, when the bidirectional communication performed periodically.

11. The communication terminal according to claim 1, wherein
 The receiving unit receives a common channel of a reception signal transmitted from a base station,
 the detecting unit detects the reception period based on the common channel, and
 the adjusting unit adjusts the transmission period of the transmission signal so that the transmission of the transmission signal starts at the same timing as a reception timing of a data channel of the reception signal.

\* \* \* \* \*